Patented Feb. 11, 1930

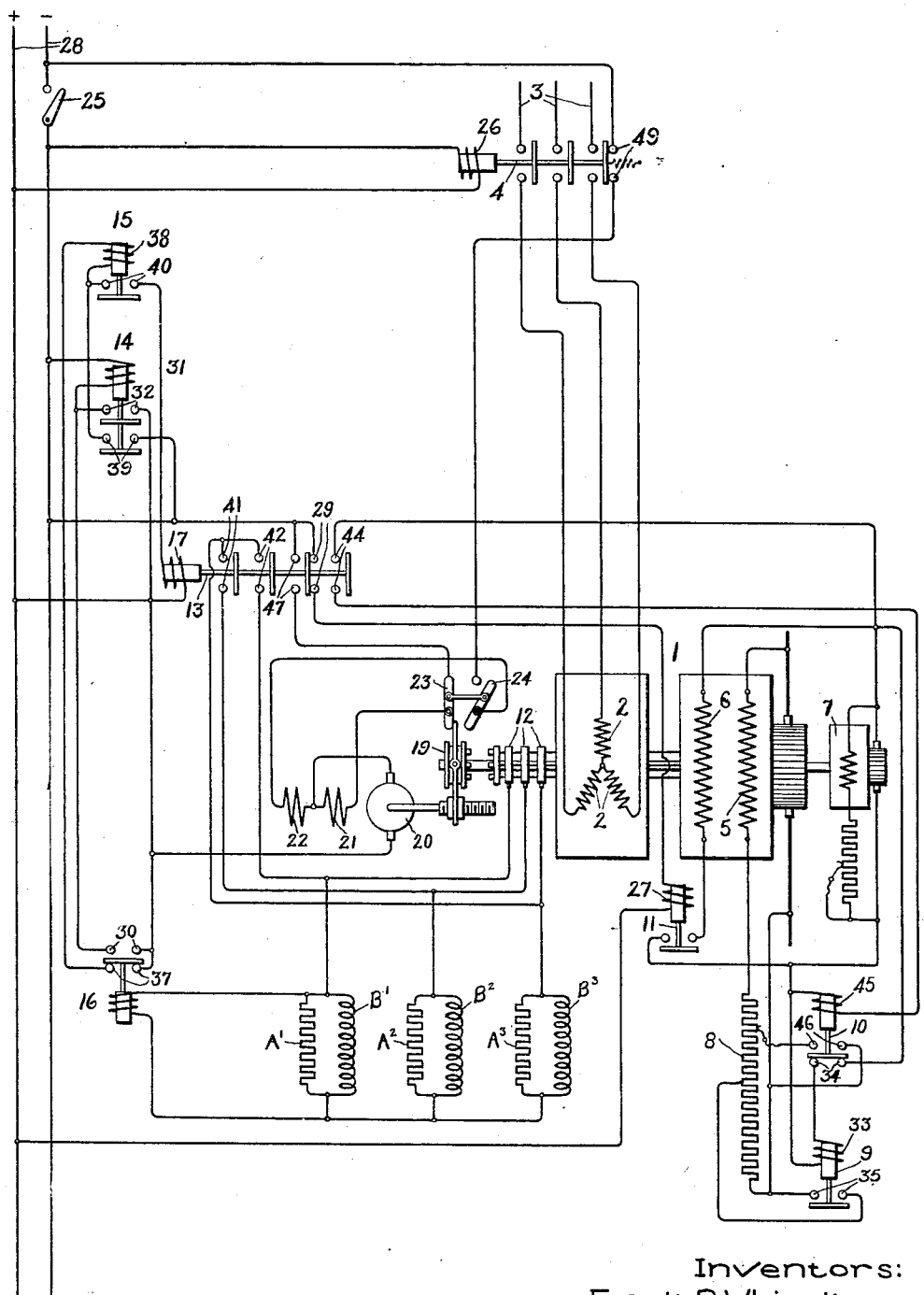

1,747,095

UNITED STATES PATENT OFFICE

FRANK P. WHITAKER AND CYRIL J. SARJEANT, OF RUGBY, ENGLAND, ASSIGNORS TO GENERAL ELECTRIC COMPANY, A CORPORATION OF NEW YORK

CONTROL SYSTEM

Application filed June 30, 1925, Serial No. 40,646, and in Great Britain July 11, 1924.

Our invention relates to a control system for starting alternating current machines and particularly electric motor converters of the type covered by Letters Patent, 772,400, granted October 18, 1904, to Bragstad and La Cour. In starting systems for such machines it has been customary to employ a reactance or choke coil across the secondary windings or phases which are brought out to the slip rings of the converter. Also, it has been customary to provide a non-inductive starting resistance with means for short circuiting it when the converter has been brought into synchronism.

An object of our invention is to provide an improved arrangement for such a machine so that the essential operations are carried out automatically in their proper sequence in order that the machine may be properly synchronized and the correct polarity maintained at the direct current terminals.

Our invention will be better understood from the following description taken in conjunction with the accompanying drawing and its scope will be pointed out in the appended claims.

In the accompanying drawing which shows one embodiment of our invention, 1 is a motor converter whose stator winding 2 is adapted to be connected to a suitable supply circuit 3 by means of a circuit breaker 4 which may be of any suitable type. The converter is provided with a main shunt field winding 5 and with an auxiliary field winding 6 which is arranged to be energized from a suitable source of potential having a definite polarity. As shown in the drawing, this source is an auxiliary shunt generator 7 driven directly from the shaft of the motor converter. This auxiliary field winding, energized from a source of definite polarity, is used to insure that the correct polarity is obtained at the direct current terminals of the converter when the converter is started. In order to limit the current in the main field winding 5 during the starting operation so as not to prevent the current in the auxiliary field winding 6 from establishing the correct polarity, a suitable current limiting device, shown as a resistor 8, is connected in series with the field winding 5. A relay 9, which operates when the speed of the converter reaches a predetermined value, is arranged to short circuit a predetermined amount of the resistor 8 so that sufficient current flows through the winding 5 to synchronize the machine. As shown in the drawing, the relay 9 is connected so as to be responsive to the voltage of the auxiliary generator 7. A relay 10 is also provided for short circuiting a predetermined amount of the resistor 8 after the starting operation is completed, so that the shunt field excitation is the right value to give normal voltage across the direct current terminals. The excitation of the auxiliary field winding 6 is controlled by a contactor 11 which is closed during the starting operation and is opened after the starting operation has been completed. The arrangement shown for synchronizing and establishing the correct polarity of the converter is disclosed and broadly claimed in a copending application of F. P. Whitaker, Serial No. 36,046, filed June 9, 1925, and assigned to the assignee of this application.

In order to limit the starting current, starting resistors $A^1$, $A^2$ and $A^3$, which are connected in parallel with the choke coils $B^1$, $B^2$ and $B^3$, respectively, are connected in series with the rotor windings of the converter by means of the slip rings 12. These starting resistors and choke coils are adapted to be short circuited by means of a contactor 13 after the converter has been synchronized. The operation of the contactor 13 is controlled by the auxiliary relays 14 and 15 and the relay 16 which is connected to one of the starting resistors so that the voltage impressed on the relay varies with the current in the rotor windings of the converter. As shown, the relay is connected across the resistor $A^1$. It will be observed that when the circuit breaker 4 is closed to start the converter, a current is induced in the secondary windings which decreases as the speed of the converter increases and reaches its minimum value when the converter pulls into synchronism. The relay 16 is designed so that it picks up and completes an energizing circuit for the control relay 14 when the circuit breaker 4 is closed to start the converter and drops down and completes an energizing circuit for the control relay 15 when the converter pulls into synchronism with the supply circuit. The circuits of the control relays 14 and 15 are interlocked so that relay 15 cannot be energized unless relay 14 is energized and both of them have to be energized in order to energize the closing coil 17 of the short circuiting contactor 13. Therefore, the short circuiting contactor 13 cannot close unless the relay 16 first picks up and energizes the control relay 14.

In order to increase the operating efficiency of motor converters, suitable means are sometimes provided for directly short-circuiting the rotor windings so that no current flows through the slip rings and comparatively long conductors between the slip rings and short circuiting contactor 13 to produce losses therein while the converter is in operation. In the drawing, such a short circuiting device 19 is diagrammatically shown and a reversible motor 20 is provided for effecting the operation of the short circuiting device 19. A circuit through the armature of the motor 20 and its field winding 21 is arranged to be completed when the contactor 13 is closed and the motor operates to move the short circuiting device 19 so that it short circuits the rotor windings. A circuit through the armature of the motor 20 and the other field winding 22 is arranged to be completed, when the circuit breaker 4 is opened, to operate the motor so that the short circuit across the rotor windings is removed. Suitable limit switches 23 and 24 are provided in both circuits of the motor so that they are opened when the short circuiting device has been moved a predetermined amount.

In the particular system shown in the drawings, the converter is started by closing a switch 25 and is shut down by opening the switch 25. This switch 25 may be operated either manually or automatically in response to some predetermined condition. Any other suitable means, however, may be used to effect the starting and stopping of the machine.

The operation of the system shown in the drawing is as follows: When it is desired to start the converter 1, the switch 25 is closed, thereby connecting the closing coils 26 and 27 of the circuit breaker 4 and the auxiliary field contactor 11 respectively across the control circuit 28. The circuit of the coil 27 also includes auxiliary contacts 29 on the contactor 13 so that it is opened when the starting resistors are short circuited. As soon as the circuit breaker 4 closes the converter starts to rotate. At the instant of starting, the relay 16 picks up and closes its contacts 30 so that a circuit for the coil 31 of the control relay 14 is completed across the control circuit 28 through the contacts of the switch 25. The relay 14, by closing its contacts 32, completes a locking circuit for itself which is independent of the contacts 30, so that when the relay 16 opens these contacts 30, the relay 14 remains energized.

As the motor converter comes up to speed the auxiliary generator 7 builds up its voltage and excites the auxiliary field winding 6 to give the correct polarity at the direct current terminals. When the voltage of the auxiliary generator reaches a predetermined value the relay 9, whose coil 33 is connected across the terminals of the generator 7 through contacts 34 of the relay 10, closes its contacts 35. The closing of these contacts 35 short circuits a predetermined amount of the resistor 8 connected in series with the main shunt field winding 5 so as to give the correct field current for synchronizing.

The converter now pulls into synchronism and this is indicated by a drop in voltage across the starting resistors $A^1$, $A^2$ and $A^3$. This drop is sufficient to cause the relay 16 to open its contacts 30 and close its contacts 37. The closing of these contacts 37 connects the coil 38 of the relay 15 across the control circuit 28. This circuit also includes the contacts 39 of the relay 14 and the starting switch 25. The closing of the contacts 40 of the relay 15 completes the circuit of the coil 17 of the short circuiting contactor 13 across the control circuit 28. By the closing of the main contacts 41 and 42, the contactor 13 short circuits the starting resistors $A^1$, $A^2$ and $A^3$.

By opening its auxiliary contacts 29, the contactor 13 effects the opening of the auxiliary field contactor 11 so that the auxiliary field winding 6 is disconnected from the auxiliary generator 7. By closing its auxiliary contacts 44, the contactor 13 completes the circuit of the coil 45 of the full field relay 10 across the terminals of the auxiliary generator 7. Relay 10, by closing its contacts 46, short circuits the proper amount of the resistor 8 to give normal voltage at the direct current terminals of the converter. The opening of the contacts 34 when the relay 10 is energized interrupts the circuit of the coil 33 of the synchronizing field contactor 9 so that the short circuit across the synchronizing tap on the main field rheostat 8 is removed.

When the short circuiting contactor 13 closes, its auxiliary contacts 47 complete across the control circuit 28 through the switch 25 the circuit of the armature winding and the field winding 21 of the motor 20 to operate the short circuiting device 19. When the short circuiting device 19 has operated the limit switch 23, which is connected in the circuit of the motor, is opened to interrupt the circuit and limit switch 24 is closed.

When it is desired to stop the converter the switch 25 is opened so that the circuit breaker 4, the relays 14, 15 and 45 and the contactor 13 are deenergized and restored to their normal positions. The opening of the circuit breaker disconnects the rotor winding 2 from the supply circuit 3 so that the converter shuts down. The opening of contactor 13 removes the short circuit from around the starting resistors $A^1$, $A^2$ and $A^3$ and the choke coils $B^1$, $B^2$ and $B^3$. The deenergization of the relay 45 removes the short circuit from around the portion of the resistor 8.

When the circuit breaker 4 opens, the closing of its auxiliary contacts 49 completes across the control circuit 28 a circuit through the limit switch 24 for the armature and field winding 22 of the motor 20 to operate the short circuiting device 19 to remove the short circuit from across the rotor windings. After the short circuiting device has been operated a predetermined amount, the limit switch 24 is opened to interrupt the circuit through the field winding 22 and the limit switch 23 is closed.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:—

1. In a starting system wherein a motor converter is started with parallel-connected resistors and choke coils in series with the rotor windings, the combination of means for controlling the excitation of said converter to synchronize and establish the correct polarity for said converter, a relay connected across one of the resistors, a control relay arranged to be energized when said first mentioned relay is energized a predetermined amount, a second control relay arranged to be energized when the energization of said first mentioned relay decreases below a predetermined value after said first mentioned control relay is energized, and switching means arranged to be operated to short circuit said resistors and choke coils and to control said excitation controlling means when said second mentioned control relay is energized.

2. In a starting system wherein a motor converter is started with current limiting means in the circuit of its rotor winding, an auxiliary field winding for the converter, a source of current connected to said field winding during the starting operation, means for short circuiting said current limiting means, and means controlled by said short circuiting means for controlling the connection of said auxiliary field winding to said source.

3. In a starting system wherein a motor converter is started with current limiting means in the circuit of the rotor winding, a shunt field winding for the converter, an auxiliary field winding, a source of current, switching means for connecting said source to said auxiliary field winding, means for short circuiting said current limiting means when the current in the rotor circuit is below a predetermined value, and means controlled by said short circuiting means for effecting the operation of said switching means to disconnect said auxiliary field winding from said source after said current limiting means is short circuited.

4. In a starting system wherein a motor converter is started with current limiting means in the circuit of its rotor winding, a shunt field winding, a resistor in the circuit of said shunt field winding, an auxiliary field winding, a source of current, switching means for connecting said source to said auxiliary field winding, means for short circuiting said current limiting means, and means controlled by said short circuiting means for effecting the operation of said switching means to disconnect said auxiliary field winding from said source and for decreasing the amount of said resistor in the circuit of said shunt field winding.

5. In a starting system wherein a motor converter is started with current limiting means in the circuit of its rotor winding, a shunt field winding, an auxiliary field winding, a shunt generator driven by said converter, switching means for connecting said generator to said auxiliary field winding, a resistor in the circuit of said shunt field winding, means responsive to a predetermined voltage of said generator for shunting a portion of said resistor to increase the shunt field circuit to synchronize said converter, means operative when said converter pulls into synchronism to short circuit said current limiting means, means controlled by said short circuiting means for effecting the operation of said switching means to disconnect said generator from said auxiliary field winding, and means controlled by said short circuiting means for shunting a portion of said resistor to cause the direct current voltage to build up to its normal value.

In witness whereof, we have hereunto set our hands this 12th day of June, 1925.

FRANK P. WHITAKER.
CYRIL J. SARJEANT.